United States Patent [19]
Henning et al.

[11] 4,271,098
[45] Jun. 2, 1981

[54] CARBURETOR FOR INTERNAL COMBUSTION ENGINES

[75] Inventors: Hans J. Henning, Neuss; Heinz Holzem, Monchen-Gladbach, both of Fed. Rep. of Germany

[73] Assignee: Pierburg Luftfahrtgeräte Union GmbH, Neuss, Fed. Rep. of Germany

[21] Appl. No.: 964,579

[22] Filed: Nov. 29, 1978

[30] Foreign Application Priority Data

Dec. 19, 1977 [DE] Fed. Rep. of Germany ....... 2756546

[51] Int. Cl.³ .......................................... F02M 17/02
[52] U.S. Cl. ............................. 261/66; 261/DIG. 50; 261/DIG. 74; 340/619
[58] Field of Search ................... 261/66, DIG. 74, 70, 261/DIG. 50; 340/619; 364/510, 442; 73/313

[56] References Cited

U.S. PATENT DOCUMENTS

| 1,987,981 | 1/1935 | Tice | 261/DIG. 74 |
| 2,490,627 | 12/1949 | Hofberg | 340/619 |
| 2,621,808 | 12/1952 | Blakeney | 340/619 |
| 2,882,520 | 4/1959 | Hass | 340/619 |
| 2,884,783 | 5/1959 | Spengler et al. | 340/619 |
| 3,005,486 | 10/1961 | Donnell | 261/70 |
| 3,242,794 | 3/1966 | Crane | 340/619 |
| 3,752,135 | 8/1973 | Peterson | 261/72 R |
| 4,006,637 | 2/1977 | Kinusita | 73/313 |
| 4,046,998 | 9/1977 | Kuno et al. | 364/442 |
| 4,050,295 | 9/1977 | Harvey | 364/442 |
| 4,054,781 | 10/1977 | Kuno | 364/442 |

Primary Examiner—Tim R. Miles
Attorney, Agent, or Firm—Toren, McGeady and Stanger

[57] ABSTRACT

A carburetor for an internal combustion engine comprises a control for maintaining the pressure of the fuel supply through the carburetor constant. The control includes a sensing device, which is preferably a level sensing device, and a fuel feed valve which is automatically operated by the sensing device. The sensing device produces signals which operate the valve to control the rate of fuel supply to the carburetor and, in order to provide an indication of the instantaneous rate of fuel consumption of an engine to which the carburetor is fitted, these signals are also fed to a fuel flow indicator. The fuel flow indicator produces a reading of the fuel flow rate either in dependence upon the frequency of opening of the valve when the opening period is constant, or in dependence upon the period for which the valve is open when the frequency of opening of the valve is constant.

19 Claims, 6 Drawing Figures

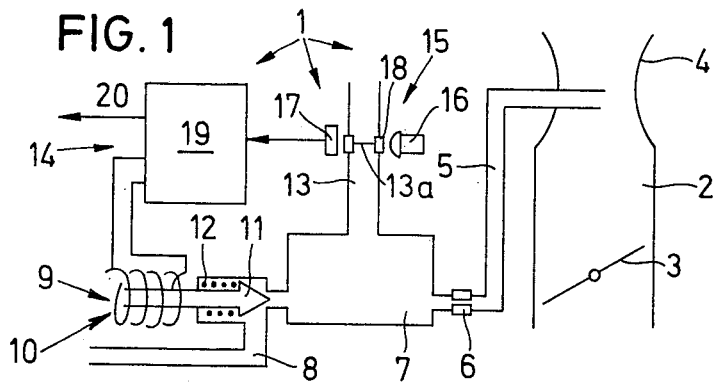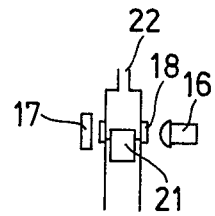
FIG. 1
FIG. 2
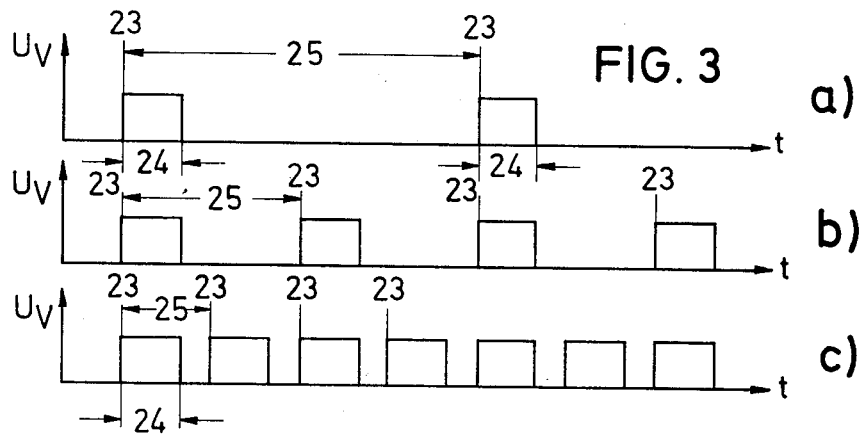
FIG. 3
a)
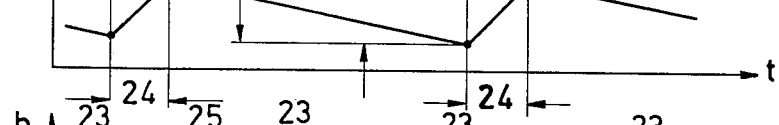
b)
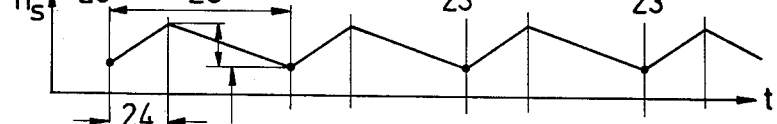
c)
FIG. 4
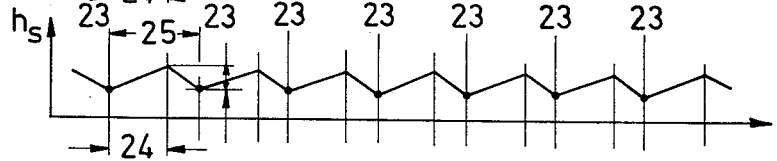

CARBURETOR FOR INTERNAL COMBUSTION ENGINES

FIELD OF THE INVENTION

This invention relates to carburetors for internal combustion engines, of the kind comprising a control for maintaining the pressure of the fuel supply through the carburetor constant, the control including a sensing device and a fuel feed valve which is automatically operated by the sensing device.

BACKGROUND OF THE INVENTION

For correct operation, carburetors require the maintenance of a predetermined fuel supply pressure. A fuel level regulator usually serves for this purpose, this regulator comprising a level sensing device and a feed valve which is automatically actuated by this device. The level sensing device is usually formed by a float in a comparatively large float chamber. The float acts upon the feed valve which is usually constructed as a needle valve and is often known as a float needle valve, by mechanical transmission members in such a way that the valve is closed as the fuel level in the chamber rises and is opened as the fuel level falls.

This form of regulator has proved satisfactory in normal operation of internal combustion engines, on account of its simplicity. It makes it practically impossible, however, accurately to determine the instantaneous fuel consumption of an engine. The reason for this is that the volume of fuel in the float housing is subject to relatively large fluctuations. These fluctuations occur firstly as a result of "float oscillation," which is produced, especially at low rates of flow, by the friction on the float and an adhesion force at the float needle valve. A further reason for the fluctuations in the volume of fuel in the float chamber lies in the splashing around of the fuel surface resulting from vibrations of the engine or movement of the vehicle in which the engine is mounted. This causes drastic movements of the float with corresponding, undesired opening and closing of the float needle valve.

The float chamber acts as a buffer or store for the different rates of flow of fuel that occur, so that the instantaneous fuel flow into the carburetor is not the same as the fuel outflow from the carburetor, that is to say the instantaneous consumption by the engine. The inflow and outflow are however the same over a fairly long period, so that average consumptions can be accurately measured and calculated. However, in a test run, for example, the accurate and continuous determination of the instantaneous fuel consumption is of interest, in order to find out as rapidly as possible the related effects of changes as the carburetor, for example of the jet equipment, and thereby to shorten the test time. Furthermore, when testing carburetors after production, considerable reductions in test times, that is substantial savings, can be achieved. The need for an indication of the instantaneous fuel consumption is not limited, however, to test the trial running, but exists in daily operation on account of high fuel prices and energy scarcity among vehicle drivers in order for the drivers to be able to adapt their driving techniques to achieve maximum economy. An acceptable price is, however, a necessary requirement for the introduction of such a fuel consumption measuring device as an additional item of equipment. The device must therefore be as simple as possible and be economical to manufacture.

SUMMARY OF THE INVENTION

The aim of the present invention is to provide a carburetor of the kind initially described which enables the instantaneous fuel consumption of an engine to which the carburetor is fitted to be measured in a simple manner.

To this end, according to this invention, in such a carburetor, the sensing device produces signals which operate the valve and also provide an indication of the rate of flow of fuel through the carburetor.

It has proved especially advantageous if the control operates discontinuously, preferably as a two-position or "on/off" control. Such an intermittent, that is a pulse-regulated, control has the particular advantage that the parts and components used are especially economical. It is however also of course possible in particular applications to use a three-position control instead of a two-position control.

In essence, sensing of any type may be used in the carburetor in accordance with the invention, but level sensing in a standpipe connected to a fuel distribution chamber is preferably utilised. It must, however, be repeated that this type of sensing, namely level sensing, is only the preferred form of sensing. Instead, for example, pressure measuring devices or the like can also be used for sensing.

When a level sensing device is provided as is preferred, this is preferably in a standpipe. This produces considerable and surprising advantages. The small liquid surface in the standpipe as compared with that in a float chamber has the effect that splashing of the fuel can only occur to a very limited extent. Moreover, even slight changes in volume cause relatively large changes in the fuel level in the standpipe. These changes are rapidly detected without delay by the level sensing device and can be counteracted by corresponding regulation of the feed valve. In consequence the volume of fuel present at any time in the carburetor can be regarded as virtually constant, so that the fuel intake to the carburetor is practically the same as the fuel discharge, i.e., is the same as the instantaneous consumption by the engine. The flow rate at the feed valve can therefore be used as a measure of the rate of fuel consumption. Since, however, with a constant supply pressure this flow rate is in practice proportional to the opening times of the feed valve, electrical signals which may be generated by the level sensing device for the regulation of the feed valve can also constitute input signals, if necessary after appropriate processing or conversion, for the indication of the rate of fuel consumption. In this manner, the instantaneous fuel consumption can be readily made visible. With the invention, therefore, the minimum time necessary for reliable measurement of the rate of fuel consumption is reduced.

This facility provided by the control of the carburetor in accordance with this invention, facilitates the testing and adjusting operations on new carburetors and considerably reduces the test time for carburetors in series production, since changes in adjustment can immediately be checked with regard to their effects upon the fuel consumption. The achievable shortening of the test times has moreover the consequence that the number of test beds can be reduced or these can be made available for other purposes.

In its preferred form the invention utilises for the first time variations of the small surface area in the standpipe, instead of the relatively large free surface which hitherto was necessary in a float chamber both for the control of the fuel supply and for providing an indication of the fuel flow rate.

The standpipe has a small cross-section, since volumetric changes then become apparent particularly rapidly and clearly, while the influences on the surface level due to splashing movements of the fuel are virtually negligible. It has been found from experiments that good results can be obtained if the cross-sectional area of the standpipe lies in the range of from 0.3 to 2 cm². The cross-sectional area of the standpipe can be optimised from the equation:

$$F_{St} = \frac{B_{zu} - B_{ab}}{\Delta h \cdot f_v}$$

where:

$F_{St}$ is the standpipe cross-sectional area in cm²;
$B_{zu}$ is the flow through feed valve in cm³/s;
$B_{ab}$ is the discharge from the distribution chamber to the engine in cm³/s;
$\Delta h$ is the level difference in the standpipe in cm;
$f_v$ is the opening and closing frequency of the feed valve in cycles/sec with a constant duration of opening.

The area of the surface is thus about a power of ten smaller than that of a conventional float chamber.

According to a further feature of the invention, the level sensing device is constructed to operate without mechanical contacts. Such a level sensing device has the advantage that it responds virtually without inertia and without interaction, since the sensing is not falsified by friction. For this purpose, the level sensing device preferably includes an optically operating sensing emitter. As an alternative, an inductively operating sensing emitter may be used.

Preferably also the sensing emitter is adjustable in height on the standpipe. This facility for height adjustment has advantages particularly in experimental work, since by corresponding adjustment and thus modification of the absolute value of the level, the fuel-air ratio produced by the carburetor can be adjusted.

A further preferred feature of the invention provides that the sensing device includes a float disposed in the standpipe. Splashes at the surface of the fuel column in the standpipe are avoided by this float; an unambiguous level indication which is sensed by the sensing device is provided by the upper edge of the float. The upper edge of the standpipe may with advantage be provided with a seating co-operating with the float, so that the top of the standpipe is automatically closed if, due to any fault, the feed valve does not shut and the fuel level in the standpipe rises too far. As a result, the escape of fuel with the risk of a carburetor fire is greatly reduced.

A possible increase in the carburetor dimensions resulting from the provision of the sensing device may be compensated by the volume of the distribution chamber being smaller than that of a conventional float chamber.

A further preferred feature of the invention provides that the feed valve be constructed as an on-off solenoid valve.

A further preferred feature of this invention provides that the level control includes an electronic circuit for processing and then transmitting the signals from the sensing device. This electronic circuit converts the electrical signals issued from the sensing emitter into control commands for the feed valve and into signals which can be evaluated to provide an indication of the rate of fuel flow. In this connection it is advantageous for the electronic circuit to generate signals proportional to the flow rate, since this facilitates the indication operation.

The feed valve may be controlled in various ways. Thus, provision can be made for the level sensing device, if the fuel level falls below a predetermined sensed value, to emit a signal which opens the feed valve for a predetermined, always constant period of time. As a result of the always constant opening time, this form of fuel level regulation reacts to a change in the fuel consumption by a corresponding increase or decrease of the opening frequency of the feed valve.

For measuring the instantaneous fuel consumption, a fuel flow rate indicator adapted to receive the signals and convert them into a flow rate value may be connected to the control.

Alternatively, the level sensing device, when the fuel level rises above a predetermined, sensed value, may generate a signal which closes the feed valve, the valve being opened with a constant frequency, or vice versa, that is to say the signal may open the feed valve which is closed with a constant frequency. Since in the former case, the opening frequency of the feed valve is always the same, a level regulation is achieved by the fact that the feed valve remains open until the sensed level is again reached. Changes in the fuel consumption are consequently allowed for by corresponding changes in the lengths of the periods of opening. Control in the reverse sense is also possible, namely by the sensing device emitting a signal, when the fuel level falls beneath a specific, sensed value, opens the feed valve, which is closed with a constant frequency.

A further variant for the control of the feed valve is obtained by the level sensing device, when a sensed maximum level is reached, generating a signal which closes the feed valve and, when a likewise sensed minimum level is reached, generating a signal which opens the feed valve. The regulation of the fuel level is thus effected with two level sensings, so that the level fluctuations of the fuel in the standpipe always remains the same, by contrast to the aforementioned forms of control. Changes in the rate of fuel consumption are provided for by the control by changing the length of the opening period and the frequency of opening of the feed valve.

Finally, the level sensing device may also be so arranged that, when the fuel falls below a predetermined sensed level, the device generates a signal which opens the feed valve and, when this level is exceeded, generates a signal which closes the feed valve. As a result of the mechanically unavoidable dead times that is the time lag in the operation in such a valve, an oscillation occurs with which the feed valve opens or closes, dependent upon the fuel consumption and upon the dead time. When a dead time independent of the oscillation frequency, which can be provided electronically, and which must be considerably greater than the mechanically unavoidable dead time, the control here again reacts to the changes in the fuel consumption by a corresponding increase or reduction in the opening period of the feed valve.

The measurement of the rate of fuel consumption in controls which respond to a change in the rate of fuel consumption by an increase or reduction in the opening periods of the feed valve can be provided by connecting to the control a flow rate indicator sensitive to the opening period or the integral of the opening periods and adapted to convert this period or integral into an indication of the flow rate. The integral of the opening periods can be determined by conventional circuits for this purpose, either in the indicator itself or, if necessary, in the electronic circuit of the control.

In the drawings:

Two examples of carburetors in accordance with the invention will now be described with reference to the accompanying drawings, in which:

FIG. 1 is a diagrammatic section through one example with electronic fuel supply level regulation;

FIG. 2 shows a second example and is a section through a differently formed standpipe of the carburetor which is otherwise the same as the first example;

FIGS. 3a to 3c are diagrams to illustrate a frequency-modulated electrical voltage at a feed valve of the carburetor shown in FIG. 1, for (a) small, (b) medium and (c) large fuel consumptions;

FIGS. 4a to 4c are diagrams to illustrate the height of a fuel column in a standpipe of the carburetor shown in FIGS. 1 and 3 for (a) small, (b) medium and (c) large fuel consumptions;

Figure 5:
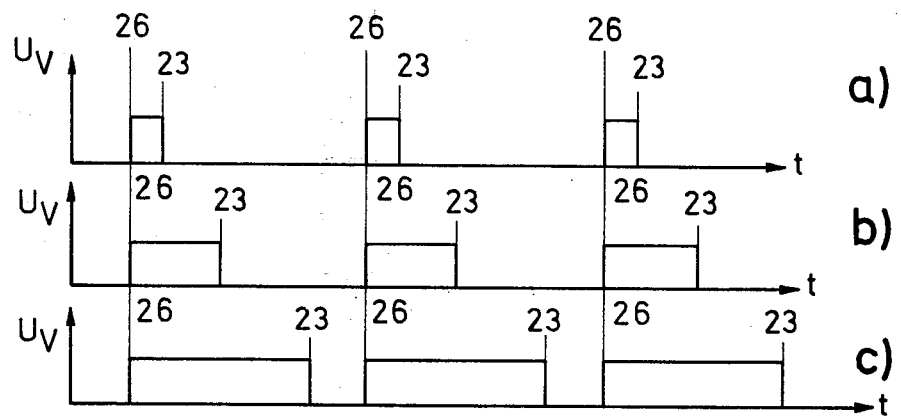

FIGS. 5a to 5c are diagrams to illustrate the voltage for a pulse duration modulated feed valve of the carburetor shown in FIG. 1, for (a) small, (b) medium and (c) large fuel consumptions; and, FIGS. 6a to 6c are diagrams to illustrate the height of a fuel column in the standpipe of the carburetor shown in FIGS. 1 and 5, for pulse duration modulation of the feed valve, for (a) small, (b) medium and (c) large fuel consumptions.

DESCRIPTION OF THE PREFERRED EMBODIMENTS

FIG. 1 shows highly diagrammatically in section a carburetor 1 which is disposed alongside an inlet 2, through which an engine, not shown, sucks in the fuel-air mixture. In the inlet 2, there is a throttle valve 3 for regulating the fuel-air mixture and, above this is a venturi tube 4 forming a restriction. A pipe 5 leads into the venturi tube 4, the pipe 5, here being indicated as a simple pipe, which is connected through a main jet 6 to a fuel distribution chamber 7. The distribution chamber 7 is supplied with fuel from a feed line 8, through which fuel at a constant pressure is introduced from a tank by means of a fuel pump, when a feed valve 9, situated upstream of the inlet into the distribution chamber 7, is opened. The feed valve 9 is a solenoid valve with a coil 10, which when electrically energised opens a valve closure member 11 against the action of a compression spring 12.

The distribution chamber 7 communicates at its upper side with a standpipe 13 of comparatively small cross-section. The fuel surface 13a is situated in the standpipe 13, so that the distribution chamber 7 itself is permanently filled with fuel. A contactless level sensing device 14 is provided at the standpipe 13. The sensing device 14 comprises a sensing emitter 15, which consists of a photoelectric cell assembly comprising a light source 16 and a light receiver 17, between which the standpipe 13 extends and is provided in this region with two windows 18 for passage of the light from the source 16.

The sensing emitter 15 produces in this example a signal when the fuel column, which is initially situated above the windows 18 and thus acts as a light barrier, falls below the windows 18 as a consequence of the outflow of fuel through the mixing pipe 5. This signal is received by an electronic circuit 19 and is converted in the circuit in such a manner that an output signal suitable for the operation of the feed valve 9 and also of a fuel consumption indicator, represented by an arrow 20, is produced. The output signal causes the coil 10 of the feed valve 9 to be energised by an electrical voltage each time for a period which is always the same, so that the valve remains open for this period.

FIG. 2 shows an alternative example of the sensing emitter of the fuel level sensing device. As a difference from the example of FIG. 1, a small float 21 is provided, and this ensures particularly at high frequencies of level change a more precise blocking or unblocking of the light path of the sensing emitter 15, since it prevents the occurrence of splashes of fuel in the standpipe. Moreover, the float 21 serves for closing an upper vent opening 22 of the standpipe 13 if, owing to some fault such as dirt, the feed valve 9 sticks open.

FIG. 3 shows, in diagrams referenced a, b and c, the voltage $U_v$ at the coil 10 of the feed valve 9 plotted against time t, for small, medium and large fuel consumptions.

As already explained above, as the fuel level sinks below the windows 18 in the standpipe 13, a signal 20 is generated and this is at the instant 23, by the sensing emitter 15. The instants 23 are denoted in the diagrams of FIG. 3 by the somewhat longer upward lines. By means of such signals, through the electronic circuit 19, a voltage $U_v$ is immediately supplied to the coil 10. The voltage $U_v$ is always maintained for the same period 24, which is equal to the opening period of the feed valve 9. As a result of the inflow of fuel into the distribution chamber 7, the fuel level 13a in the standpipe 13 is again raised above the windows 18 and thus the light path between the light source 16 and the light receiver 17 is interrupted.

Depending upon the instantaneous flow of fuel from the distribution chamber 7 into the intake pipe 2 and thus upon the fuel consumption of the engine the time which elapses until the fuel level 13a has again fallen below the windows 18 and has again triggered a signal at a further instant 23, will be larger or smaller. FIG. 3a shows a relatively large time interval 25, designated by the double arrow, between two signals. This means that there is only a small flow of fuel in the inlet 2, the fuel surface level 13a falling only slowly after the feed valve 9 closes. In FIG. 3b, the time interval 25 is shortened by one half. The sinking of the fuel level 13a in the standpipe 13 and thus the triggering of a signal therefore takes place in substantially shorter periods, that is smaller intervals of time 25. Finally, in FIG. 3c, the spacings between the closing and opening of the feed valve 9 and thus the time intervals 25 between the signals are now only very short, which indicates a high fuel consumption. The limit at which this type of level regulation will still operate is given by the condition that the time interval 25 between two signals is greater than the always constant opening period 24 of the feed valve 9 by the time required for resetting the electrical circuit 19 and the feed valve 9 into the starting position.

From the illustration in the diagrams of FIG. 3, it becomes clear that, because of the always constant opening period 24 of the feed valve 9, a change in the fuel consumption is allowed for by a corresponding change in the intervals between the signals 23 and thus their frequency. The signals 23 can be utilised, in addition to the controlling of the feed valve 9, as an input for an indicator, which converts the frequency into a fuel consumption indication. Since the change in fuel volume in the distribution chamber 7 caused by the small area of the fuel surface 13a in the standpipe 13 is only small, the fuel intake through the feed valve 9 measured by the determination of frequency is practically equal to the fuel output into the intake pipe 2. The fuel consumption measuring device which processes the frequency of signals or openings therefore directly indicates the instantaneous fuel consumption of the engine at any time.

In FIG. 4, the height $h_s$ of the fuel column in the standpipe 13 is plotted against time t. The individual diagrams referenced a, b and c correspond to the diagrams in FIG. 3 having the same reference letters.

Here it can be seen that, when the signal 23 occurs and thus the feed valve 9 opens, the level of the fuel column in the standpipe 13 rises until the valve closes again and then falls until the next signal 23. The difference between the highest and lowest fuel level becomes smaller as the fuel consumption increases and thus the frequency of the signals and of opening becomes higher. This is because the fuel discharge into the intake pipe 2 becomes progressively closer to the fuel intake in the opening phase of the feed valve 9, as the fuel consumption progressively increases. The only slight increase in the fuel level during the opening period 24 of the feed valve 9 which occurs with high fuel consumption (FIG. 4c) and the rapid decrease in the fuel level when the feed valve 9 is closed have the effect that the time interval 25 is very much reduced.

Figure 6:
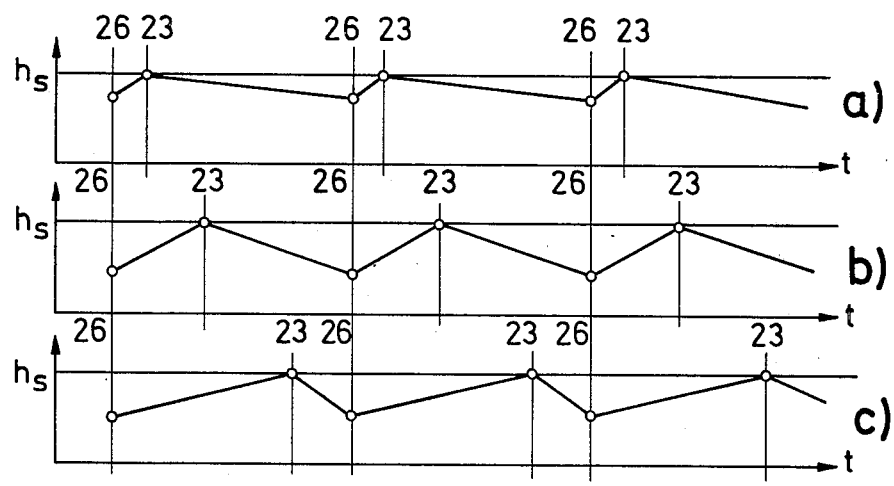

FIGS. 5 and 6 show in the same manner as in FIGS. 3 and 4 the voltage $U_v$ at the coil 10 of the feed valve 9 plotted against time t (FIG. 5) and the associated height fluctuations of the fuel column in the standpipe 13 (FIG. 6) for (a) small, (b) medium and (c) high fuel consumptions, when a different construction of electronic circuit 19 is used.

From these two figures it can be seen that the electronic circuit 19 here provides, not an always equal opening period of the valve, but an always constant frequency of the instant of opening. The frequency of the signal and of opening are constant, but in contrast with the example according to FIGS. 1 to 4, allowance is made for the changes in the rate of fuel discharge from the distribution chamber 7 owing to changes in fuel consumption by changing the lengths of the periods 24 for which the feed valve is open. For this purpose, the light source 16 and the light receiver 17 as shown in FIGS. 1 or 2 are so constructed that a signal is emitted when the light beam is interrupted by the rising fuel column after the valve 9 has opened. The upper fuel level is therefore limited by the photoelectric cell assembly. Upon interruption of the light beam, the feed valve 9 is closed and, after an always equal time interval 25, as measured from the preceding opening instant 26, the valve 9 is opened again.

With this form of electronic circuit 19, the opening period of the feed valve 9 must be utilised for determining the fuel consumption. This is done by integration of the opening period 24 of the feed valve 9, either in the electronic circuit 19 itself or in an indicator device and by subsequent conversion into an indication value of the instantaneous fuel flow rate.

We claim:

1. In a carburetor for an internal combustion engine, said carburetor comprising control means for maintaining the pressure of fuel supplied through said carburetor constant, said control means including a sensing device, a fuel feed valve and means operatively connecting said sensing device to said fuel feed valve to operate said fuel feed valve and control the rate of supply of fuel to said carburetor, the improvement wherein said sensing device includes signal producing means, instantaneous flow rate indicating means and means operatively connecting said signal producing means to both said valve and said flow rate indicating means whereby said signals operate said valve and cause said instantaneous flow rate indicating means to provide an indication of the instantaneous rate of flow of fuel through said carburetor.

2. A carburetor as claimed in claim 1, wherein said control means includes intermittently operating means.

3. A carburetor as claimed in claim 2, wherein said control means comprises two-point control means.

4. A carburetor as claimed in claim 1, wherein said control means further includes means defining a fuel distribution chamber, a standpipe, means communicating said standpipe with said chamber, means mounting said standpipe in a position upstanding above said chamber and wherein said sensing device includes means for sensing the level of fuel in said standpipe.

5. A carburetor as claimed in claim 4, wherein said sensing device is free of mechanical contacts whereby frictional drag in said sensing device is minimised.

6. A carburetor as claimed in claim 5, wherein said level sensing device includes an optically operating sensing emitter.

7. A carburetor as claimed in claim 5, wherein said level sensing device includes an inductively operating sensing emitter.

8. A carburetor as claimed in claim 6, further comprising means mounting said sensing emitter for adjustment in height relative to said standpipe.

9. A carburetor as claimed in claim 4, wherein said sensing device includes float means disposed in said standpipe.

10. A carburetor as claimed in claim 9, wherein said standpipe includes an upper end, and further comprising a valve seating at said upper end and means on said float for cooperating with said seating to close said upper end when said float approaches said upper end of said standpipe.

11. A carburetor as claimed in claim 1, wherein said sensing device includes signal emitting means and said control means includes electronic circuit means and further comprising means connecting said signal emitting means to said electronic circuit means whereby said electronic circuit means processes and transmits signals from said signal emitting means.

12. A carburetor as claimed in claim 11, wherein said electronic circuit means includes means for producing signals proportional to the flow rate of said fuel through said carburetor.

13. A carburetor as claimed in claim 1, wherein said sensing device includes fuel level sensing means, said fuel level sensing means including means to emit a signal when said fuel falls below a predetermined sensed level and means communicating said signal with said feed valve whereby said signal causes said feed valve to be opened for a predetermined constant period of time each time said fuel falls below said predetermined sensed level.

14. A carburetor as claimed in claim 13, further comprising fuel flow rate indicator means and means connecting said fuel flow rate indicator means to said control means, said fuel flow rate indicator means being sensitive to the frequency of signals emitted by said level sensing means and said indicator means including means for providing an indication of said fuel flow rate in dependence upon said frequency.

15. A carburetor as claimed in claim 1, wherein said sensing device includes fuel level sensing means, said fuel level sensing means including means to emit a signal when said fuel rises above a predetermined sensed level, means communicating said signal with said feed valve, means for opening said valve at a constant frequency and said means communicating said signal with said valve closing said valve whereby said valve is closed every time said fuel rises above said predetermined sensed level.

16. A carburetor as claimed in claim 1, wherein said sensing device includes fuel level sensing means, said sensing means including means for emitting a signal when said fuel falls below a predetermined sensed level, means communicating said signal with said valve to open said valve and means for closing said valve at a predetermined constant frequency, whereby said valve is opened every time said fuel level falls below said predetermined level until said fuel level has risen above said predetermined level.

17. A carburetor as claimed in claim 1, wherein said sensing device includes fuel level sensing means, said sensing means including means for sensing a maximum level of said fuel, means for sensing a minimum level of said fuel, means for emitting a signal when said maximum level is sensed, means for emitting a signal when said minimum level is sensed and means communicating said signals with said valve whereby said valve is closed every time said fuel reaches said maximum level and said valve is opened every time said fuel reaches said minimum level.

18. A carburetor as claimed in claim 1, wherein said sensing device includes fuel level sensing means, said sensing means including means for producing a signal when said fuel falls below a predetermined sensed level, means communicating said signal with said valve to open said valve when said fuel falls below said predetermined sensed level and means for producing another signal when said fuel rises above said predetermined sensed level, said another signal being operative to close said valve when said fuel rises above said predetermined level.

19. A carburetor as claimed in claim 15, further comprising a fuel flow rate indicator, means connecting said indicator to said control, said indicator being sensitive to each period when said valve is open or to the integral of a series of open periods of said valve, said indicator including means for indicating the rate of flow of said fuel in dependence upon said period or said integral.

* * * * *